United States Patent
Endo et al.

(10) Patent No.: US 9,896,074 B2
(45) Date of Patent: Feb. 20, 2018

(54) BOOSTER AND BRAKE APPARATUS USING THE SAME

(75) Inventors: Mitsuhiro Endo, Minami-ALPS (JP); Hiroshi Owada, Utsunomiya (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 1321 days.

(21) Appl. No.: 13/366,609

(22) Filed: Feb. 6, 2012

(65) Prior Publication Data
US 2012/0200147 A1 Aug. 9, 2012

(30) Foreign Application Priority Data
Feb. 7, 2011 (JP) .................................. 2011-023869

(51) Int. Cl.
| | |
|---|---|
| *B60T 8/38* | (2006.01) |
| *B60T 8/48* | (2006.01) |
| *B60T 1/10* | (2006.01) |
| *B60T 7/04* | (2006.01) |
| *B60T 11/18* | (2006.01) |
| *B60T 13/573* | (2006.01) |

(Continued)

(52) U.S. Cl.
CPC .................. *B60T 8/38* (2013.01); *B60T 1/10* (2013.01); *B60T 7/042* (2013.01); *B60T 8/4872* (2013.01); *B60T 11/18* (2013.01); *B60T 13/573* (2013.01); *B60T 13/586* (2013.01); *B60T 13/74* (2013.01); *B60T 2270/604* (2013.01); *B60W 30/18127* (2013.01)

(58) Field of Classification Search
CPC . B60T 1/10; B60T 8/38; B60T 8/4872; B60T 13/52; B60T 13/573; B60T 13/586; B60T 13/74; B60T 2270/604; B60T 11/18; B60W 30/18127

USPC .......... 303/113.3, 114.1, 114.3, 152; 60/552, 60/553; 91/369.2, 371–373, 376 R
See application file for complete search history.

(56) References Cited

U.S. PATENT DOCUMENTS

| | | | | | |
|---|---|---|---|---|---|
| 4,286,826 A | * | 9/1981 | Leiber | ........................ | 303/114.2 |
| 4,846,047 A | * | 7/1989 | Uyama et al. | ............... | 91/369.4 |

(Continued)

FOREIGN PATENT DOCUMENTS

| | | |
|---|---|---|
| GB | 2 348 684 | 10/2000 |
| JP | 2009-202678 | 9/2009 |

OTHER PUBLICATIONS

Second Office Action dated Aug. 7, 2015 in corresponding Chinese patent application No. 201210024744.8 (with English translation).

*Primary Examiner* — Melody M Burch
(74) *Attorney, Agent, or Firm* — Wenderoth, Lind & Ponack, L.L.P.

(57) ABSTRACT

An input rod is operated by a brake pedal to introduce the air into a variable-pressure chamber through a control valve to propel a power piston, thereby advancing a primary piston to generate a brake fluid pressure in a master cylinder. A part of the reaction force from the fluid pressure is transmitted to the input rod through a reaction member. The primary piston is provided with an idle stroke in which no fluid pressure is generated, and the reaction force to be transmitted to a plunger is limited by a reaction force adjusting spring. In the region of the idle stroke, a fluid pressure is supplied to a wheel cylinder through a fluid pressure control unit to perform regenerative cooperative control, and a reaction force from a reaction spring is applied to the input rod.

13 Claims, 8 Drawing Sheets

(51) Int. Cl.
*B60T 13/58* (2006.01)
*B60T 13/74* (2006.01)
*B60W 30/18* (2012.01)

(56) References Cited

U.S. PATENT DOCUMENTS

| | | | |
|---|---|---|---|
| 5,098,171 A * | 3/1992 | Siegel | 303/113.4 |
| 6,282,896 B1 * | 9/2001 | Wachi et al. | 60/547.2 |
| 7,021,724 B2 * | 4/2006 | Shinohara | B60T 13/57 303/114.3 |
| 2006/0214504 A1 * | 9/2006 | Kusano | 303/113.4 |
| 2008/0236959 A1 * | 10/2008 | Hashida et al. | 188/72.2 |
| 2013/0257140 A1 * | 10/2013 | Ogiwara et al. | 303/3 |

\* cited by examiner

BOOSTER AND BRAKE APPARATUS USING THE SAME

BACKGROUND OF THE INVENTION

The present invention relates to a booster that boosts a brake operation force with an actuator, and also relates to a brake apparatus using the booster.

Regenerative cooperative control is a known technique used in brake apparatus for vehicles to obtain a desired braking force by controlling the braking force distribution between friction braking using a fluid pressure brake and regenerative braking using a dynamo, e.g. a motor generator. Japanese Patent Application Publication No. 2009-202678 discloses a brake control apparatus including a fluid pressure control unit interposed between a master cylinder and a fluid pressure brake for each wheel. The fluid pressure control unit has a pump, an accumulator, an electromagnetic valve, and so forth to selectively increase, reduce or maintain a fluid pressure to be supplied to the fluid pressure brake. During regenerative braking, the fluid pressure control unit adjusts a fluid pressure to be supplied to the fluid pressure brake, thereby performing regenerative cooperative control.

However, the following problem is associated with a brake control apparatus performing regenerative cooperative control using a fluid pressure control unit as the one disclosed in Japanese Patent Application Publication No. 2009-202678. When the brake fluid pressure is increased or reduced by the fluid pressure control unit during execution of regenerative cooperative control, the fluid pressure in the master cylinder varies. Consequently, the reaction force to the operation of a brake pedal varies, which degrades the brake pedal operation feeling.

SUMMARY OF THE INVENTION

An object of the present invention is to provide a booster configured to reduce the variation of reaction force to the brake pedal during regenerative cooperative control to improve the brake pedal operation feeling.

Another object of the present invention is to provide a brake apparatus using the booster of the present invention.

To solve the above-described problem, the present invention provides a booster including an input member movable in response to an operation of a brake pedal, an assisting member capable of advancing and retracting relative to the input member, an actuator arranged to propel the assisting member in response to the movement of the input member so that the assisting member follows the input member, a reaction force distribution mechanism arranged to combine thrust of the input member and thrust of the assisting member into a combined thrust and transmit the combined thrust to a piston of a master cylinder and further distribute a reaction force from the piston to the input member and to the assisting member, and a reaction force application member arranged to apply a reaction force to the propulsion of the input member. During the time from when a fluid pressure is generated in the master cylinder in response to an operation of the brake pedal until the thrust of the actuator reaches a full-load state, the input member does not receive the reaction force from the reaction force distribution mechanism until the input member has moved by a predetermined stroke from an initial position, but receives the reaction force from the reaction force distribution mechanism for a further stroke of the input member.

In addition, the present invention provides a brake apparatus for use in a vehicle including a regenerative brake device provided for at least one wheel to generate a regenerative braking force. The brake apparatus includes a master cylinder arranged to generate a fluid pressure by propulsion of a piston, and a booster that inputs an operation force of a brake pedal to an input member to boost the operation force and to propel a piston of the master cylinder with the boosted operation force. The booster has a reaction force application member that applies a reaction force to the propulsion of the input member. The brake apparatus further includes a stroke sensor detecting a stroke of the brake pedal, and a fluid pressure control unit interposed between the master cylinder and a wheel cylinder that brakes the wheel with a fluid pressure supplied thereto. The fluid pressure control unit controls the fluid pressure to be supplied to the wheel cylinder. Further, the brake apparatus includes a regenerative cooperative device arranged to produce a braking force corresponding to the stroke of the brake pedal by distribution between a braking force generated by the regenerative brake device and a braking force generated by the supply of fluid pressure from the fluid pressure control unit to the wheel cylinder. At least either one of the master cylinder and the booster keeps the master cylinder from generating a fluid pressure until the brake pedal moves from an initial position to a stroke position beyond a predetermined regenerative full-load point at which the braking force of the regenerative brake device reaches a predetermined full-load state. The booster does not receive a reaction force from the fluid pressure in the master cylinder until the fluid pressure in the master cylinder reaches a predetermined fluid pressure, or until the stroke of the brake pedal reaches the regenerative full-load point. The booster receives the reaction force from the fluid pressure in the master cylinder after the fluid pressure in the master cylinder has reached a predetermined fluid pressure, or after the stroke of the brake pedal has reached the regenerative full-load point.

According to the present invention, it is possible to reduce the variation of reaction force to the brake pedal during regenerative cooperative control to improve the brake pedal operation feeling.

DETAILED DESCRIPTION OF THE INVENTION

Figure 1:
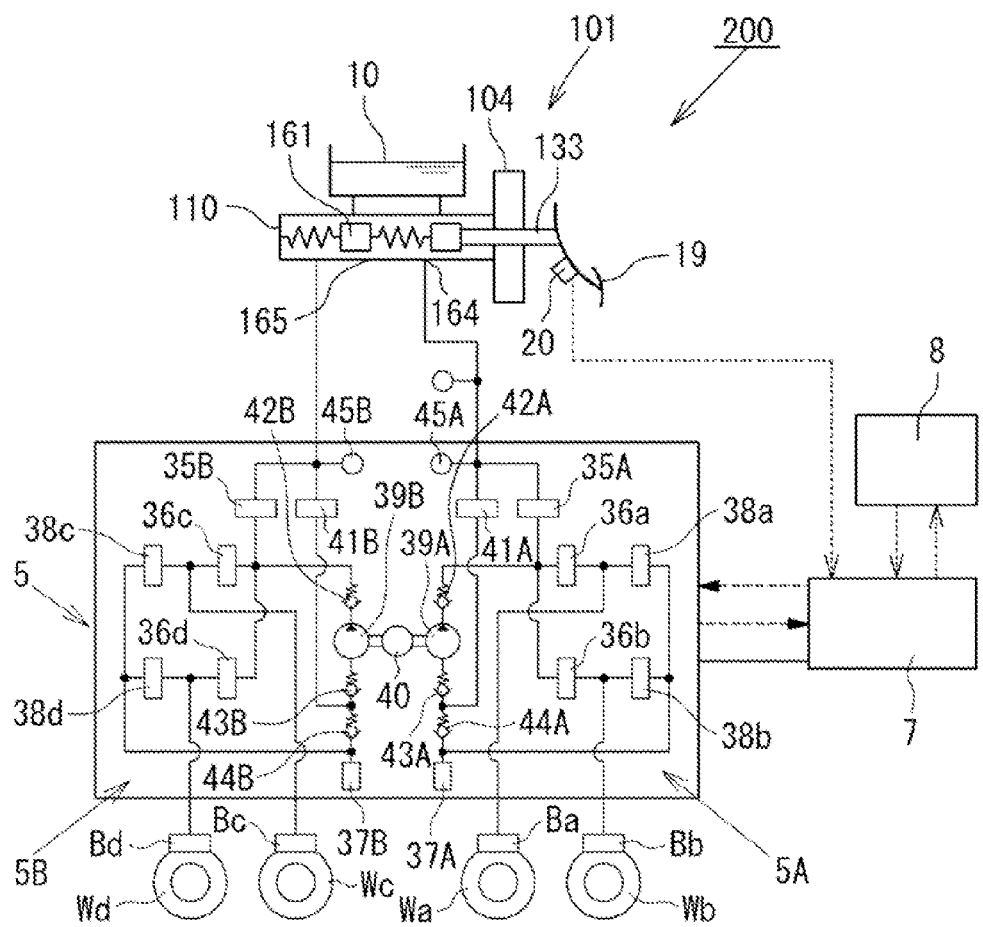
FIG. 1 is a conceptual block diagram of a brake apparatus including a booster according to a first embodiment of the present invention.

Embodiments of the present invention will be explained below in detail with reference to the accompanying drawings. An automotive brake apparatus 200 using a booster 101 according to a first embodiment of the present invention will be explained with reference to FIG. 1. The brake apparatus 200 has a booster 101, a fluid pressure control unit 5 connected to fluid pressure ports 164 and 165 of a master cylinder 110 installed on the booster 101 to supply a brake fluid pressure to wheel cylinders Ba to Bd of fluid pressure brakes for wheels Wa to Wd, a controller 7 controlling the fluid pressure control unit 5, and a regenerative brake device 8 performing regenerative braking.

The fluid pressure control unit 5 has a two-system fluid pressure circuit arranged in the form of "X-piping". The two-system fluid pressure circuit includes a first fluid pressure circuit 5A (the right side of the center of the fluid pressure control unit 5 as seen in FIG. 1) for supplying a fluid pressure from the primary port 164 of the master cylinder 110 to the wheel cylinders Ba and Bb of the brakes for the left front wheel Wa and the right rear wheel Wb, and a second fluid pressure circuit 5B (the left side of the center of the fluid pressure control unit 5 as seen in FIG. 1) for supplying a fluid pressure from the secondary port 165 of the master cylinder 110 to the wheel cylinders Bc and Bd of the brakes for the right front wheel We and the left rear wheel Wd.

In this embodiment, the brakes are fluid pressure disk brakes that supply a fluid pressure to the wheel cylinders Ba to Bd to advance the associated pistons, causing brake pads to press against respective disk rotors rotating together with the wheels, thereby generating braking force. The brakes, however, may be other types of fluid pressure brakes, e.g. publicly known drum brakes.

The first fluid pressure circuit 5A and the second fluid pressure circuit 5B have a similar arrangement. The fluid pressure circuits connected to the brakes Ba to Bd for the wheels Wa to Wd are also similar in arrangement to each other. In the following description, the suffixes A and B and a to d added to the reference marks indicate that the constituent elements denoted by these reference marks correspond to the first fluid pressure circuit 5A and the second fluid pressure circuit 5B and the wheels Wa to Wd, respectively.

The fluid pressure control unit 5 has supply valves 35A and 35B which are electromagnetic on-off valves controlling the supply of fluid pressure from the master cylinder 110 to the wheel cylinders of the brakes Ba to Bd for the wheels Wa to Wd. The fluid pressure control unit 5 further has pressure increasing valves 36*a* to 36*d* which are electromagnetic on-off valves controlling the supply of fluid pressure to the brakes Ba to Bd, system reservoirs 37A and 37B for releasing the fluid pressure from the brakes Ba to Bd, pressure reducing valves 38*a* to 38*d* which are electromagnetic on-off valves controlling the release of fluid pressure from the brakes Ba to Bd to the system reservoirs 37A and 37B, pumps 39A and 39B for supplying a fluid pressure to the wheel cylinders Ba to Bd of the brakes, a pump motor 40 driving the pumps 39A and 39B, booster valves 41A and 41B which are electromagnetic on-off valves controlling the supply of fluid pressure from the master cylinder 110 to the suction sides of the pumps 39A and 39B, check valves 42A, 42B, 43A, 43B, 44A and 44B for preventing back-flow from the downstream side of the pumps 39A and 39B toward the upstream side thereof, and fluid pressure sensors 45A and 45B detecting fluid pressures at the primary port 164 and secondary port 165 of the master cylinder 110.

The following operating modes can be executed by controlling the operations of the supply valves 35A and 35B, the pressure increasing valves 36*a* to 36*d*, the pressure reducing valves 38*a* to 38*d*, the booster valves 41A and 41B and the pump motor 40 through the fluid pressure control unit 5.

[Normal Braking Mode]

During normal braking, the supply valves 35A and 35B and the pressure increasing valves 36*a* to 36*d* are opened, and the pressure reducing valves 38*a* to 38*d* and the booster valves 41A and 41B are closed, thereby supplying a fluid pressure from the master cylinder 110 to the wheel cylinders Ba to Bd of the wheels Wa to Wd.

[Pressure Reducing Mode]

The pressure reducing valves 38*a* to 38*d* are opened, and the supply valves 35A and 35B, the pressure increasing valves 36*a* to 36*d*, and the booster valves 41A and 41B are closed, thereby releasing the fluid pressure from the wheel cylinders Ba to Bd into the reservoirs 37A and 37B, thereby reducing the fluid pressure in the wheel cylinders Ba to Bd.

[Pressure Maintaining Mode]

The pressure increasing valves 36*a* to 36*d* and the pressure reducing valves 38*a* to 38*d* are closed, thereby maintaining the fluid pressure in the wheel cylinders Ba to Bd.

[Pressure Increasing Mode]

The pressure increasing valves 36*a* to 36*d* are opened, and the supply valves 35A and 35B, the pressure reducing valves 38*a* to 38*d*, and the booster valves 41A and 41B are closed. In this state, the pump motor 40 is operated, thereby returning brake fluid from the reservoirs 37A and 37B toward the master cylinder 110 to increase the fluid pressure in the wheel cylinders Ba to Bd.

[Boosting Mode]

The booster valves 41A and 41B and the pressure increasing valves 36*a* to 36*d* are opened, and the pressure reducing valves 38*a* to 38*d* and the supply valves 35A and 35B are closed. In this state, the pump motor 40 is operated to activate the pumps 39A and 39B to supply brake fluid to the wheel cylinders Ba to Bd irrespective of the fluid pressure in the master cylinder 110.

Various control operations can be performed by appropriately executing the above-described operating modes according to the vehicle conditions. For example, it is possible to execute the following control: braking force distribution control to appropriately distribute braking force to each wheel according to the ground load and so forth during braking; anti-lock brake control to prevent locking of wheels by automatically adjusting braking force for each wheel during braking; vehicle stability control to stabilize behavior of the vehicle through suppression of under steer and over steer by automatically applying braking force to each wheel appropriately irrespective of the amount of operation of the brake pedal 19; hill start assist control to assist starting on a gradient (up gradient in particular) with the vehicle kept braked; traction control to prevent wheel spin at the time of starting and so forth; vehicle following control to maintain a predetermined distance between the vehicle concerned and a vehicle ahead; lane deviation avoidance control to keep the vehicle in the driving lane; and obstacle avoidance control to avoid collision with an obstacle.

As the pumps 39A and 39B, publicly known fluid pressure pumps may be used, for example, plunger pumps, trochoid pumps, gear pumps, and so forth. Gear pumps are preferably used from the viewpoint of vehicle mountability, silence, pump efficiency, and so forth. The pump motor 40 may be a publicly known DC motor, DC brushless motor, or AC motor, for example. A DC brushless motor is preferably used from the viewpoint of controllability, silence, durability, vehicle mountability, and so forth.

Characteristics of the electromagnetic on-off valves of the fluid pressure control unit 5 may be appropriately set according to the mode of use. In this regard, however, the following structure is preferable from the viewpoint of fail-safe and control efficiency. That is, the supply valves 35A and 35B and the pressure increasing valves 36*a* to 36*d* are constructed as normally-open valves, and the pressure reducing valves 38*a* to 38*d* and the booster valves 41A and 41B are constructed as normally-closed valves. With this structure, when no control signal is available from the fluid pressure control unit 5, the required fluid pressure can be supplied from the master cylinder 110 to the brakes Ba to Bd.

The regenerative brake device 8 drives a dynamo (electric motor) by the rotation of at least one wheel during deceleration and braking, thereby recovering kinetic energy as electric power. The regenerative brake device 8 and the controller 7 exchange control signals with each other to perform regenerative cooperative control based on a signal from a stroke sensor 20 detecting the driver's operation of the brake pedal 19. That is, during regenerative braking, a required brake fluid pressure is calculated by subtracting a fluid pressure corresponding to a braking force generated by regenerative braking from a required brake fluid pressure calculated on the basis of the signal from a stroke sensor 20 and the brake fluid pressure thus obtained is supplied to the wheel cylinders Ba to Bd, thereby obtaining a desired braking force.

Figure 2:
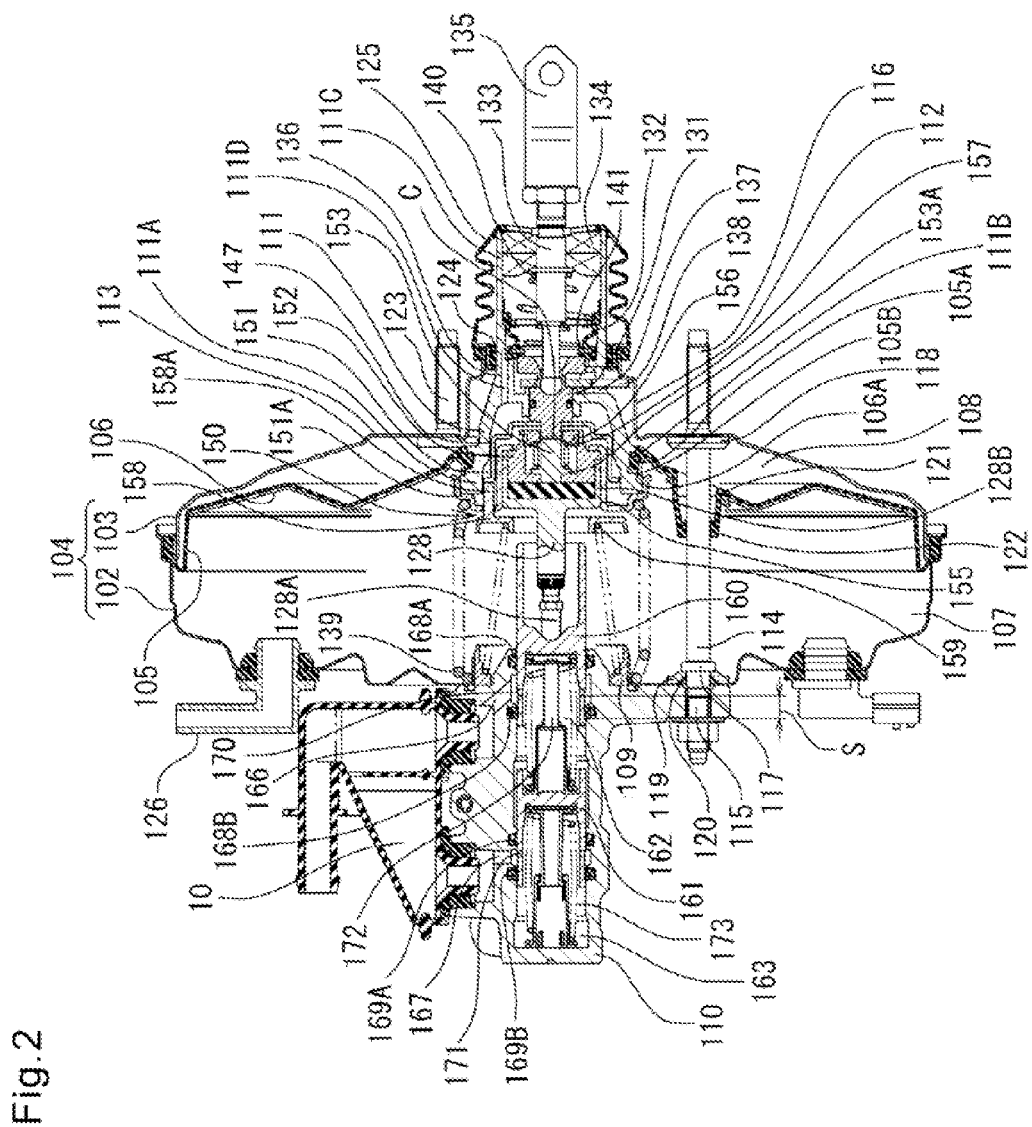
FIG. 2 is a vertical sectional view of the booster according to the first embodiment and a master cylinder.

FIG. 2 shows a fluid pressure generating system including the booster 101 according to the first embodiment and the master cylinder 110 installed on the booster 101. The booster 101 is a single-type pneumatic booster having a pneumatic actuator as a boost source. The booster 101 has a housing 104. The housing 104 is formed by joining together a front shell 102 and a rear shell 103, which are formed from a thin plate. The interior of the housing 104 is divided into two chambers, i.e. a constant-pressure chamber 107 and a variable-pressure chamber 108, by a power piston 106 having a diaphragm 105. The front shell 102 and the rear shell 103 are each in the shape of a substantially circular cylinder, one end of which is closed. The front and rear shells 102 and 103 are air-tightly joined by fitting the opening edge of the outer periphery of the rear shell 103 into the opening edge of the outer periphery of the front shell 102 and putting an outer peripheral portion of the diaphragm 105 between the opening edges of the front and rear shells 102 and 103.

The master cylinder 110 is secured to the front shell 102, with the rear end of the master cylinder 110 inserted into an opening 109 in the center of the bottom of the front shell 102. The rear shell 103 has a rear cylindrical portion 112 projecting from the center of the bottom thereof to allow a valve body 111 (assisting member; described later) to be inserted thereinto. The rear shell 103 has a rear bearing surface 113 formed around the rear cylindrical portion 112. The rear bearing surface 113 abuts against the dash panel (not shown) of the vehicle body.

The housing 104 is provided with a tie rod 114 extending therethrough from the front shell 102 to the rear bearing surface 113 of the rear shell 103. The tie rod 114 has a mounting thread portion 115 and a securing thread portion 116 on the opposite ends thereof. The proximal end portions of the mounting and securing thread portions 115 and 116 are enlarged in diameter to form a front flange 117 and a rear flange 118, respectively. The front flange 117 air-tightly abuts against the inner side of a front bearing surface of the master cylinder 110 with a retainer 119 and a seal 120 interposed therebetween, and the rear flange 118 air-tightly abuts against the inner side of the rear bearing surface 113. In this state, the front shell 102 is secured to the rear shell 103 by caulking. The central portion of the tie rod 114 extends through an opening 121 provided in the power piston 106 and through a substantially circular cylindrical rod seal 122 integral with the diaphragm 105 slidably and air-tightly relative to the power piston 106 and the diaphragm 105.

There are two tie rods 114 (only one of them is shown in the figures) spaced from each other in the diametrical direction of the front and rear shells 102 and 103. The mounting thread portion 115 of each tie rod 114 is used to secure the master cylinder 110 to the front shell 102, and the securing thread portion 116 is used to secure the rear bearing surface 113 to the above-described dash panel (not shown) of the vehicle body. In addition, the rear bearing surface 113 has rear bolts 123 secured thereto by caulking. The rear bolts 123 are used to secure the rear bearing surface 113 to the dash panel.

The front end of the substantially circular cylindrical valve body 111 is enlarged in diameter to form a circular cylindrical portion 111A. The cylindrical portion 111A is inserted into respective central openings 105A and 106A of the diaphragm 105 and the power piston 106. An inner peripheral edge 105B of the central opening 105A of the diaphragm 105 is fitted in an outer peripheral groove 111B of the valve body 111, thereby allowing the diaphragm 105 and the valve body 111 to be air-tightly connected to each other. The valve body 111 has a reduced-diameter cylindrical portion 111C at the rear end thereof. The reduced-diameter cylindrical portion 111C extends through the variable-pressure chamber 108 and is inserted through the rear cylindrical portion 112 of the rear shell 103 to extend to the outside. The cylindrical portion 112 has a seal member 124 fitted thereto to slidably seal between the cylindrical portion 112 and the reduced-diameter cylindrical portion 111C of the valve body 111. In addition, a bellows-shaped dust cover 125 is provided between the cylindrical portion 112 and the reduced-diameter cylindrical portion 111C of the valve body 111. The front shell 102 has a connecting pipe 126 secured thereto. The connecting pipe 126 is connected to a vacuum source (not shown), e.g. an engine intake pipe, to maintain the constant-pressure chamber 107 under a predetermined negative pressure at all times.

The cylindrical portion 111A at the front end of the valve body 111 is provided with a reaction force adjusting mechanism 150. The valve body 111 transmits the thrust thereof through the reaction force adjusting mechanism 150 to an output rod 128 abutting against a primary piston 160 (described later) of the master cylinder 110. The output rod 128 has a distal end portion 128A abutting against the primary piston 160 and a proximal end portion 128B formed in the shape of a cup to contain a disk-shaped reaction member 155 (reaction force distribution mechanism). Through the reaction member 155, the output rod 128 receives a force transmitted from the reaction force adjusting mechanism 150 and transmits a reaction force from the master cylinder 110.

The reaction force adjusting mechanism 150 has a cup-shaped retaining member 151 fitted to the cup-shaped proximal end portion 128B of the output rod 128, a substantially circular cylindrical reaction force receiving member 152 secured by being fitted into the retaining member 151, and a substantially columnar reaction force transmitting member 153 (reaction force adjusting member) axially movably guided in the reaction force receiving member 152. The retaining member 151 has a stepped flange-shaped spring retainer 151A integrally formed on the outer periphery of the opening thereof. The spring retainer 151A is secured by being fitted to the front end of the valve body 111. The reaction force receiving member 152 has a rear end portion extending from the opening in the bottom of the retaining member 151. The front end of the reaction force receiving member 152 is fitted to the proximal end portion 128B of the output rod 128 to abut against the reaction member 155. The reaction force transmitting member 153 is urged toward the reaction member 155 by a reaction force adjusting spring 157 which is a compression coil spring. The reaction force adjusting spring 157 is interposed between an enlarged-diameter spring retainer 153A formed on an axially intermediate portion of the reaction force transmitting member 153 and a guide portion 156 of the reaction force receiving member 152 that guides the reaction force transmitting member 153. The guide portion 156 is secured to the reaction force receiving member 152. Abutment of the spring retainer 153A against the reaction force receiving member 152 restrains the reaction force transmitting member 153 from moving toward the reaction member 155, with the front end of the spring retainer 153A abutting against the reaction member 155. It should be noted that, although in this embodiment the reaction member 155 is contained in the cup-shaped proximal end portion 128B of the output rod 128, the reaction force receiving member 152 may be provided with a recess to contain the reaction member 155. In such a case, the output rod 128 can be simplified in configuration by forming the proximal end portion 128B in a disk-like shape.

A plunger 131 is inserted in the reduced-diameter cylindrical portion 111C at the rear end of the valve body 111 in the state of being sealed at the outer periphery thereof. The plunger 131 is axially slidably and air-tightly guided between the enlarged-diameter cylindrical portion 111A and the reduced-diameter cylindrical portion 111C of the valve body 111. The plunger 131 has a reduced-diameter portion at the front end thereof. The reduced-diameter front end portion of the plunger 131 is inserted into the guide portion 156 of the reaction force receiving member 152 so as to face the reaction force transmitting member 153 across a gap C. The plunger 131 is connected with the distal end of an input rod 133 (input member) inserted into the valve body 111 from the rear end of the latter. With this structure, the plunger 131 is operated by the input rod 133. The proximal end portion of the input rod 133 extends to the outside through an air-permeable dust seal 134 fitted into the rear end portion of the valve body 111. A clevis 135 is secured to the proximal end of the input rod 133 to connect the brake pedal 19 (see FIG. 1) to the input rod 133. In addition, a control valve 132 is inserted in the reduced-diameter cylindrical portion 111C of the valve body 111. The control valve 132 is on-off controlled by the plunger 131. The control valve 132 is urged in a direction for closing the valve by a valve spring 141 retained at one end thereof by the input rod 133.

The valve body 111 has a side wall 111D provided with a constant-pressure passage 136 extending in the axial direction of the valve body 111 to communicate with the constant-pressure chamber 107. The side wall 111D is further provided with a variable-pressure passage 137 extending in the radial direction of the valve body 111 to communicate with the variable-pressure chamber 108. The control valve 132 switches between connection and cut-off of the constant-pressure passage 136 and the atmosphere (dust seal 134 side) with respect to the variable-pressure passage 137 according to the relative displacement between the valve body 111 and the plunger 131. When the brake pedal 19 is not operated, the constant-pressure passage 136 (i.e. constant-pressure chamber 107) and the atmosphere (dust seal 134 side) are cut off from the variable-pressure passage 137 (i.e. variable-pressure chamber 108). When the brake pedal 19 is operated to advance the plunger 131 relative to the valve body 111, the variable-pressure passage 137 is connected to the atmosphere (dust seal 134 side), with the constant-pressure passage 136 left cut off from the variable-pressure passage 137. At this time, the variable-pressure passage 137 is open to the atmosphere through the dust seal 134.

A stop key 138 is inserted in the variable-pressure passage 137 extending radially through the side wall 111D of the valve body 111. The stop key 138 limits the retract position of the valve body 111 by engaging with a stepped portion of the cylindrical portion 112 of the rear shell 103. In addition, the stop key 138 limits the amount of relative displacement between the valve body 111 and the plunger 131 by movably engaging in an outer peripheral groove on the plunger 131.

A return spring 139 is provided between the front wall of the front shell 102 and the spring retainer 151A of the retaining member 151 secured to the cylindrical portion 111A at the front end of the valve body 111. The return spring 139 urges the valve body 111 toward a retract position thereof. A return spring 140 is provided in the reduced-diameter cylindrical portion 111C at the rear end of the valve body 111 to urge the input rod 133 toward a retract position thereof.

A cup-shaped pressing member 147 is axially slidably fitted to the outer periphery of the retaining member 151 of the reaction force adjusting mechanism 150. The pressing member 147 has the reduced-diameter portion at the front end of the plunger 131 inserted through an opening in the bottom of the pressing member 147. The bottom of the pressing member 147 abuts against a stepped portion of the plunger 131. The retaining member 151 is provided with an annular spring retainer 158 at the inner peripheral side of the return spring 139 forward of the spring retainer 151A thereof. The spring retainer 158 is integrally formed with an abutting portion 158A. The abutting portion 158A extends through the spring retainer 151A of the retaining member 151 to abut against the front end of the pressing member 147. A reaction spring 159 (reaction force application member) is interposed between the front wall of the front shell 102 and the spring retainer 158. The reaction spring 159 is a tapered coil spring smaller in diameter than the return spring 139. In this embodiment, the reaction spring 159 and the return spring 139 are disposed with their axial positions aligned with each other, thereby downsizing the booster 101. It should be noted that, although in this embodiment the reaction spring 159 is a tapered coil spring, the present invention is not limited thereto. It is possible to use any of reaction force application members, e.g. various coil springs such as a barrel-shaped spring and an hourglass-shaped spring, a coiled wave spring, a combination of coned disk springs, and an elastic member made of rubber or resin.

Although in this embodiment the reaction spring 159 as a reaction force application member is provided in the housing 104, the present invention is not limited thereto. The reaction spring 159 may be provided outside the housing 104, for example, on the brake pedal 19, or between the input rod 133 and the rear shell 103. The reaction force application member may be formed by the return spring 140 without using the reaction spring 159.

The master cylinder 110 has a circular cylindrical primary piston 160 fitted in an opening-side part thereof. The primary piston 160 has a cup-shaped distal end portion. The master cylinder 110 further has a cup-shaped secondary piston 161 fitted in a bottom-side part thereof. The rear end portion of the primary piston 160 projects from the opening of the master cylinder 110 and abuts against the distal end of the output rod 128 in the constant-pressure chamber 107. The master cylinder 110 has two pressure chambers, i.e. a primary chamber 162 and a secondary chamber 163, formed therein by the primary piston 160 and the secondary piston 161. The primary chamber 162 and the secondary chamber 163 are provided with fluid pressure ports 164 and 165 (see FIG. 1), respectively. The fluid pressure ports 164 and 165 are connected to the wheel cylinders Ba to Bd of the fluid pressure brakes for the wheels Wa to Wd through the fluid pressure control unit 5 having a two-system fluid pressure circuit (see FIG. 1).

The upper side of the side wall of the master cylinder 110 is provided with reservoir ports 166 and 167 for connecting the primary chamber 162 and the secondary chamber 163 to a reservoir 10. Two seal members 168A and 168B seal between the cylinder bore of the master cylinder 110 and the primary piston 160. Similarly, two seal members 169A and 169B seal between the cylinder bore of the master cylinder 110 and the secondary piston 161. The seal members 168A and 168B are disposed to axially face each other across the reservoir port 166. When the primary piston 160 is in a non-braking position shown in FIG. 2, the primary chamber 162 communicates with the reservoir port 166 through a port 170 provided in the side wall of the primary piston 160. When the primary piston 160 advances from the non-braking position by a predetermined idle stroke S, the primary chamber 162 is cut off from the reservoir port 166 by the seal member 168B. Consequently, the primary chamber 162 is pressurized (see FIG. 4). Similarly, the seal members 169A and 169B are disposed to axially face each other across the reservoir port 167. When the secondary piston 161 is in a non-braking position shown in FIG. 2, the secondary chamber 163 communicates with the reservoir port 167 through a port 171 provided in the side wall of the secondary piston 161. When the secondary piston 161 advances from the non-braking position by a predetermined idle stroke S, the secondary chamber 163 is cut off from the reservoir port 167 by the seal member 169B. Consequently, the secondary chamber 163 is pressurized.

A spring assembly 172 is interposed between the primary piston 160 and the secondary piston 161 in the primary chamber 162. A return spring 173 is interposed between the bottom of the master cylinder 110 and the secondary piston 161 in the secondary chamber 163. The return spring 173 is a compression coil spring. The spring assembly 172 comprises a compression coil spring held in a predetermined compressed state by an expandable retainer so that the spring assembly 172 can be compressed against the spring force thereof. The primary piston 160 and the secondary piston 161 normally move simultaneously to pressurize the primary chamber 162 and the secondary chamber 163 simultaneously.

Although in the foregoing embodiment a tandem master cylinder is used by way of example, a single master cylinder may be used when using a brake system in which the front two wheels are hydraulically controlled and the rear wheels are electrically controlled, for example.

Figure 8:
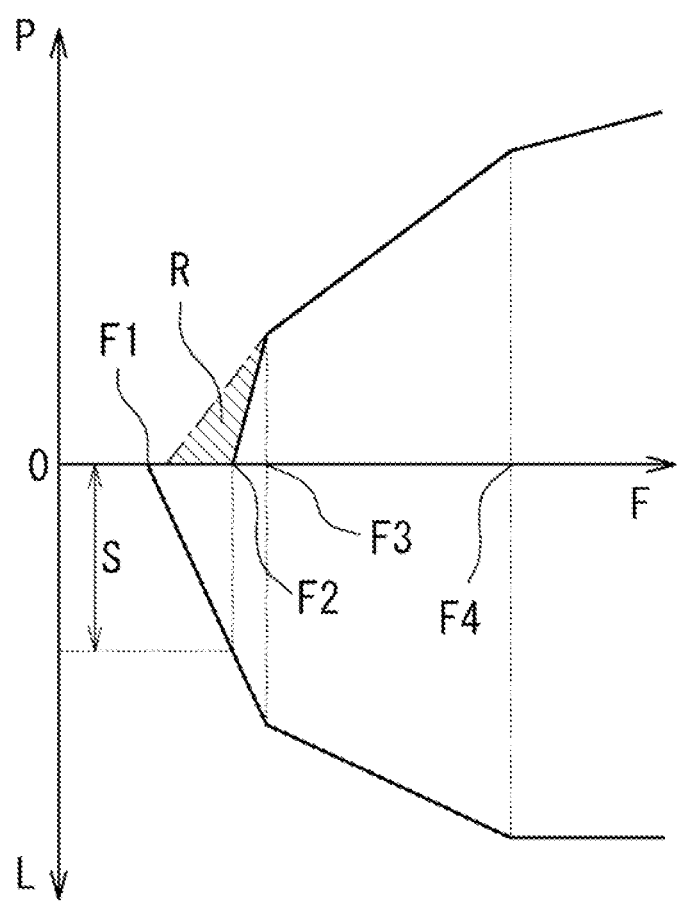
FIG. 8 is a graph showing the input-output characteristics of the booster shown in FIG. 1.

Next, the operation of the booster 101 will be explained with reference to FIGS. 2 to 5 and 8. It should be noted that FIG. 8 shows the relationship between the input F to the input rod 133 (i.e. the pedal pressure applied to the brake pedal 19), on the one hand, and, on the other, the fluid pressure P (and braking force) in the master cylinder 110 and the stroke L of the input rod 133.

In the non-braking state shown in FIG. 2, the plunger 131 is in the non-braking position shown in the figure, and the constant-pressure chamber 107 and the variable-pressure chamber 108 are at the same pressure. Therefore, no thrust is generated in the power piston 106. At this time, the constant-pressure passage 136 (i.e. constant-pressure chamber 107) and the variable-pressure passage 137 (i.e. variable-pressure chamber 108) are cut off by the control valve 132.

When depression of the brake pedal 19 is started (see input F1 in FIG. 8) and the plunger 131 is advanced by the input rod 133 against the spring force of the reaction spring 159 acting on the plunger 131 through the spring retainer 158 and the pressing member 147 and the spring force of the return spring 140, the plunger 131 separates from the control valve 132, causing the variable-pressure passage 137 to be opened to the atmosphere, thereby allowing the air to be introduced into the variable-pressure chamber 108. Consequently, a differential pressure is produced between the constant-pressure chamber 107 and the variable-pressure chamber 108, and this differential pressure generates thrust in the power piston 106. Accordingly, the valve body 111 advances, causing the output rod 128 to advance through the reaction member 155 to press the primary piston 160 of the master cylinder 110. When the valve body 111 advances, the variable-pressure passage 137 is cut off from the atmosphere by the control valve 132. Accordingly, the differential pressure between the constant-pressure chamber 107 and the variable-pressure chamber 108, i.e. the thrust of the power piston 106, is maintained. Consequently, the valve body 111 moves following the movement of the plunger 131

Figure 3:
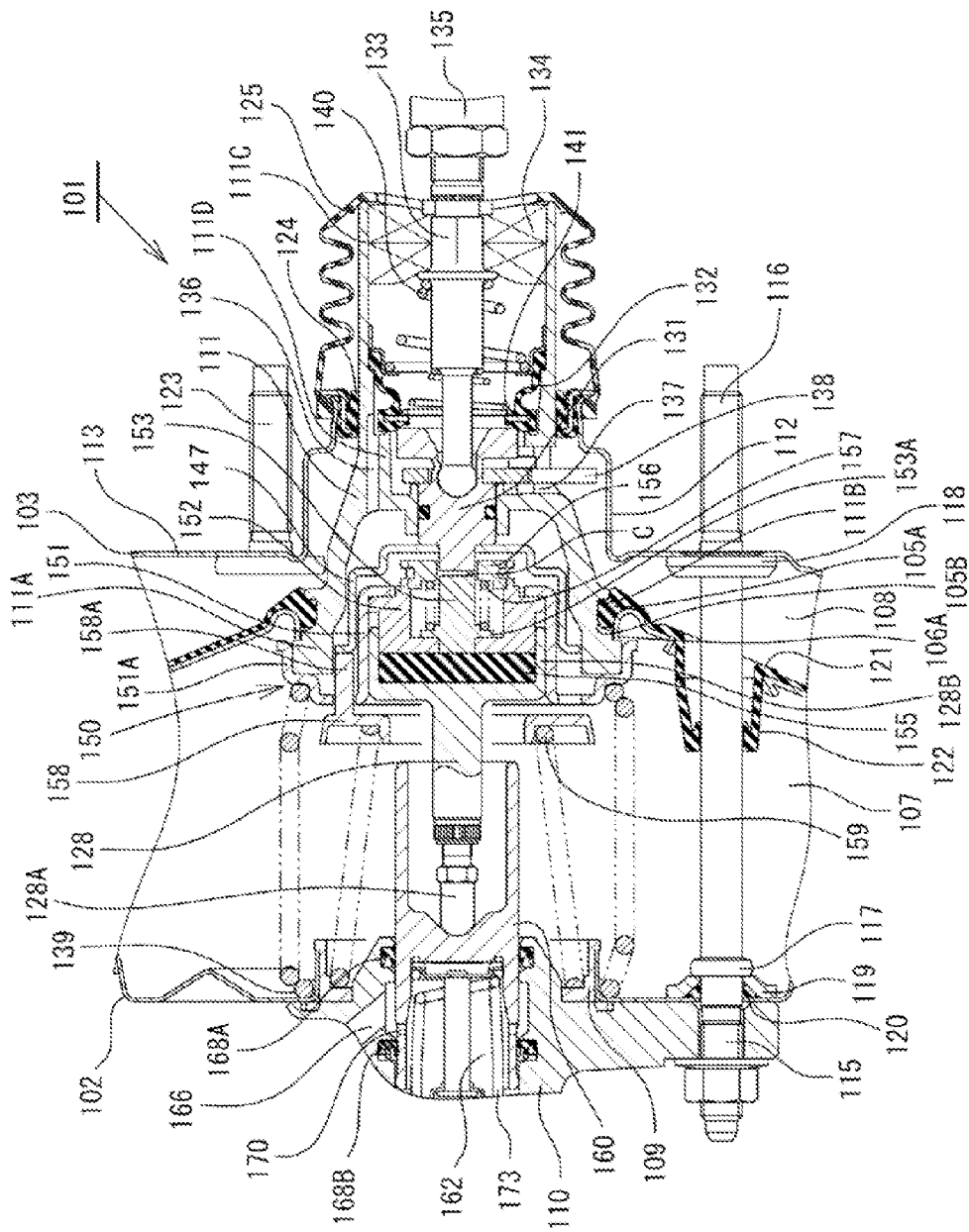
FIG. 3 is a fragmentary enlarged view of the booster in FIG. 1, showing a state where the piston of the master cylinder is in an idle stroke range in which the master cylinder generates no fluid pressure.

At this time, as shown in FIGS. 2 and 3, no fluid pressure is generated in the master cylinder 110 and no reaction force from fluid pressure is generated until the primary piston 160 and the secondary piston 161 reach the idle stroke position S. Accordingly, only a reaction force from the spring force of the reaction spring 159 (biasing force application member) acts on the brake pedal 19.

Figure 4:
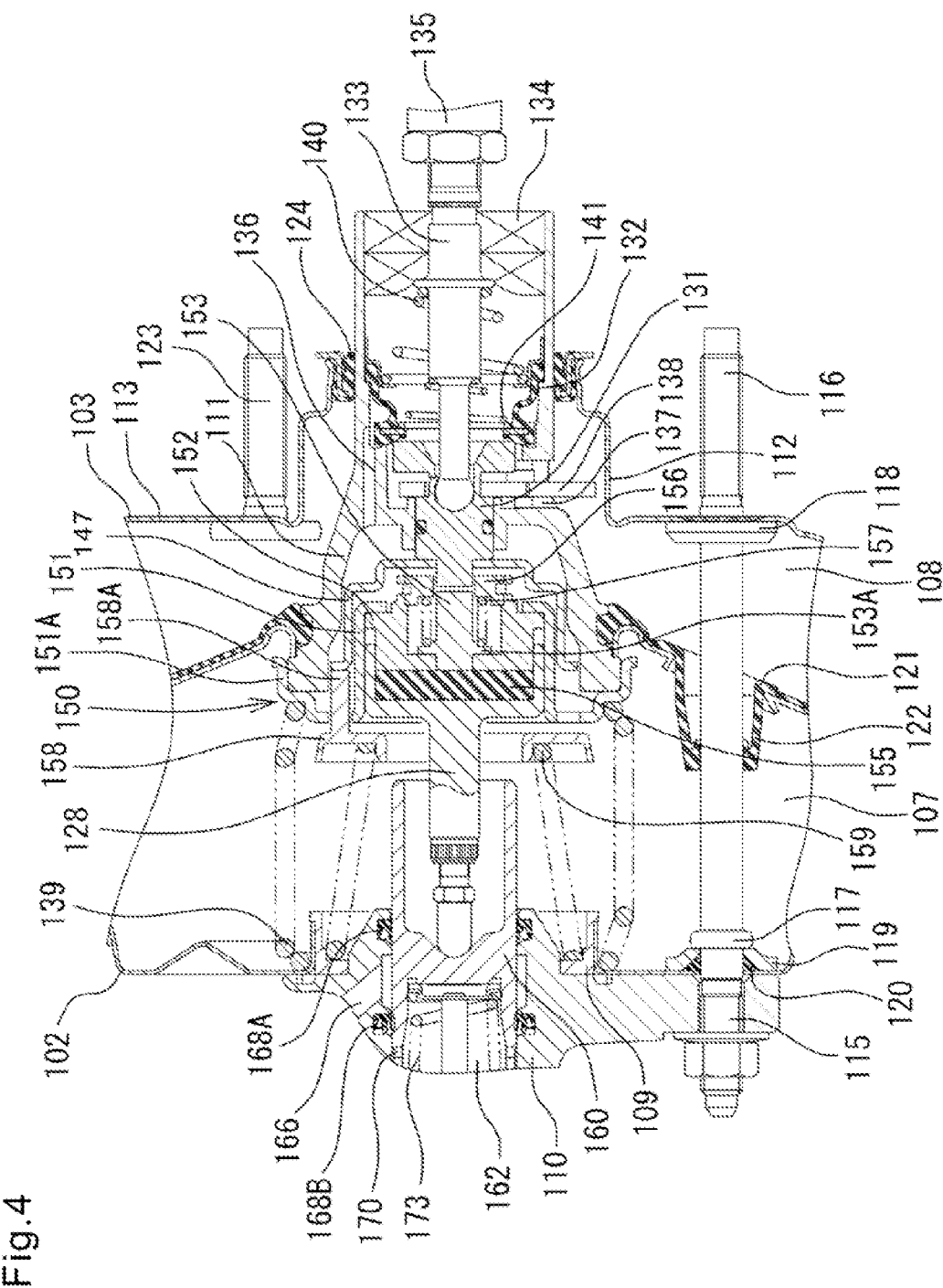
FIG. 4 is a fragmentary enlarged view of the booster in FIG. 1, showing a state where the master cylinder generates a fluid pressure and a reaction force from the fluid pressure is not transmitted to an input rod.

When the brake pedal 19 is further depressed so that the primary piston 160 reaches the idle stroke position S, as shown in FIG. 4, the ports 170 and 171 are closed by the seal members 168B and 169B, resulting in a fluid pressure being generated in the master cylinder 110 (see the input F2 in FIG. 8), and a reaction force from the fluid pressure acts on the valve body 111 through the reaction member 155 and further through the reaction force receiving member 152. At this time, a part of the reaction force also acts on the reaction force transmitting member 153 through the reaction member 155. However, the reaction force transmitting member 153 is urged toward the reaction member 155 by the reaction force adjusting spring 157. Therefore, the reaction force transmitting member 153 does not move until the reaction force acting on the reaction force transmitting member 153 reaches the spring force of the reaction force adjusting spring 157. In addition, the gap C is provided between the reaction force transmitting member 153 and the plunger 131. Therefore, the reaction force from the fluid pressure in the master cylinder 110 does not act on the plunger 131, but the reaction force from the spring force of the reaction spring 159 and that of the return spring 140 continues to act on the plunger 131. Thus, it is possible to maintain a favorable brake operation feeling on the brake pedal 19 independent of the fluid pressure in the master cylinder 110.

Figure 5:
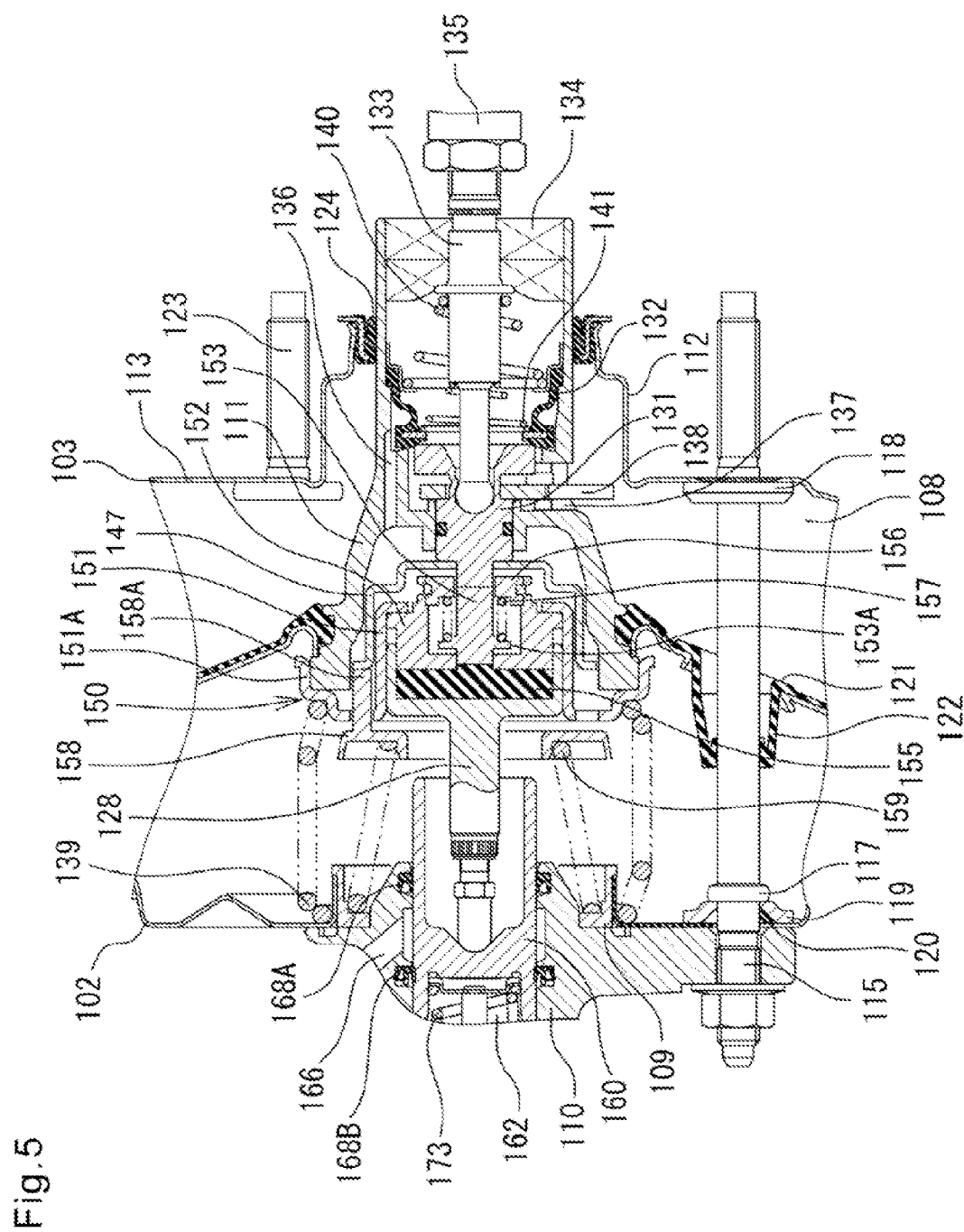
FIG. 5 is a fragmentary enlarged view of the booster in FIG. 1, showing a state where the master cylinder generates a fluid pressure and a reaction force from the fluid pressure is transmitted to the input rod.

When the brake pedal 19 is further depressed, the valve body 111 further advances, causing the fluid pressure in the master cylinder 110 to increase, resulting in an increase in the reaction force from the fluid pressure. When the reaction force applied from the reaction member 155 to the reaction force transmitting member 153 exceeds the spring force of the reaction force adjusting spring 157, as shown in FIG. 5, the reaction force transmitting member 153 retracts and abuts against the plunger 131 (see input F3 in FIG. 8). Consequently, a part of the reaction force from the fluid pressure in the master cylinder 110 acts on the plunger 131. As a result, the boost ratio of the booster 101 decreases, but a reaction force increasing in accordance with the fluid pressure increase in the master cylinder 110 is transmitted to the brake pedal 19, and it is possible to give the driver a stiff brake feeling that cannot be obtained with the reaction spring 159 alone. Thereafter, when the brake pedal 19 is further depressed to reach the full-load point (see input F4 in FIG. 8), the boost ratio further decreases.

When the brake pedal 19 is returned to cancel the input to the input rod 133, the plunger 131 retracts, and the variable-pressure passage 137 is connected to the constant-pressure passage 136 in the state of being cut off from the atmosphere by the control valve 132. Thus, the differential pressure between the constant-pressure chamber 107 and the variable-pressure chamber 108 is canceled, and the thrust in the power piston 106 disappears. Consequently, the power piston 106 retracts following the movement of the plunger 131 to return to the non-braking position shown in FIG. 2.

The following is an explanation of the control of the brake apparatus 200 by the controller 7.

During the time from when the depression of the brake pedal 19 is started until the stroke of the primary piston 160 and the secondary piston 161 reaches the idle stroke S, the controller 7 operates the fluid pressure control unit 5 to supply the brake fluid to the wheel cylinders Ba to Bd on the basis of the stroke of the input rod 133 (i.e. brake pedal 19) detected by the stroke sensor 20, thereby generating a braking force corresponding to the amount of operation of the brake pedal 19. At this time, a reaction force corresponding to the amount of operation of the brake pedal 19 is applied to the brake pedal 19 by the spring force of the reaction spring 159.

Normally, in the above-described braking region (region of inputs F1 to F3 in FIG. 8), regenerative braking is performed by the regenerative brake device 8 after a short idle time from F1, and regenerative cooperative control is executed by the controller 7. During the execution of regenerative cooperative control, the regenerative brake device 8 generates a regenerative braking force corresponding to a target braking force determined based on the stroke of the input rod 133 detected by the stroke sensor 20. If the regenerative braking force is insufficient, a brake fluid pressure corresponding to the difference between the target braking force and the regenerative braking force is supplied to the wheel cylinders Ba to Bd, thereby obtaining a desired braking force.

During the regenerative cooperative control, no fluid pressure is generated in the master cylinder 110 until the stroke of the input rod 133 reaches the idle stroke S (input F2 in FIG. 8). Therefore, regenerative braking can be utilized to the maximum, so that energy can be recovered efficiently. Even when the fluid pressure in the master cylinder 110 is varied by the regenerative cooperative operation of the fluid pressure control unit 5, the fluid pressure in the master cylinder 110 will not increase because the primary chamber 162 and the secondary chamber 163 of the master cylinder 110 are in communication with the reservoir 10. Accordingly, there is no kickback on the brake pedal 19 due to the reaction force from the fluid pressure, and the driver can operate the brake pedal 19 without feeling uncomfortable. By configuring the system so that the regenerative brake device 8 reaches a maximum regenerative state in the region of idle stroke S, regenerative braking can be utilized to the maximum, and the energy can be recovered efficiently. When the regenerative brake device 8 does not perform regenerative braking in the region of idle stroke S, the fluid pressure control unit 5 generates a fluid pressure corresponding to the stroke of the input rod 133. Therefore, it is possible to prevent the driver from having an uncomfortable sensation when feeling deceleration in response to the operation of the brake pedal 19.

The term "maximum regenerative state" as used herein means the maximum braking force (often represented by force or acceleration) of the regenerative brake device set in the stage of designing the vehicle.

Although it is preferable for the regenerative brake device 8 to reach the maximum regenerative state in the region of inputs F1 to F3 in FIG. 8, the regenerative quantity may differ even for the same input from the input rod depending on vehicle running conditions because the regenerative quantity is adjusted according to the vehicle speed, the battery charge condition, the road surface p, and so forth. There are cases where the regenerative braking is stopped depending on vehicle running conditions.

When the brake pedal 19 is further depressed so that the stroke of the primary piston 160 reaches the idle stroke S (see input F2 in FIG. 8), the reservoir port 166 is closed, and a fluid pressure is generated in the master cylinder 110. Consequently, a reaction force from the fluid pressure acts on the reaction force receiving member 152 and the reaction force transmitting member 153 through the reaction member 155. At this time, the reaction force transmitting member 153 does not move until the reaction force acting on the reaction force transmitting member 153 reaches the spring force of the reaction force adjusting spring 157. In addition, the gap C is provided between the reaction force transmitting member 153 and the plunger 131. Therefore, the reaction force from the fluid pressure in the master cylinder 110 does not act on the plunger 131, but only the reaction force from the spring force of the reaction spring 159 and the return spring 140 continuously acts on the plunger 131. Thus, it is possible to maintain a favorable operation feeling on the brake pedal 19 independent of the fluid pressure in the master cylinder 110.

Thus, regarding the oblique-line area R in FIG. 8, no master cylinder fluid pressure is generated, but a braking force is generated by the regenerative brake device 8 or the fluid pressure control unit 5. By so doing, it is possible to obtain a desired braking force (one-dot chain line in FIG. 8) corresponding to the amount of operation of the brake pedal 19, which is equivalent to a braking force obtained when the master cylinder fluid pressure in the oblique-line area R is generated.

When the brake pedal 19 is further depressed, the valve body 111 further advances, causing the fluid pressure in the master cylinder 110 to increase, resulting in an increase in the reaction force from the fluid pressure. When the reaction force applied from the reaction member 155 to the reaction force transmitting member 153 exceeds the spring force of the reaction force adjusting spring 157, as shown in FIG. 5, the reaction force transmitting member 153 retracts and abuts against the plunger 131 (see input F3 (predetermined stroke position; predetermined pedal pressure) in FIG. 8). Consequently, a part of the reaction force from the fluid pressure in the master cylinder 110 acts on the plunger 131.

At this time, the regenerative brake device 8 terminates the regenerative braking, and the controller 7 allows the fluid pressure control unit 5 to shift to the normal braking mode to supply the fluid pressure in the master cylinder 110 to the wheel cylinders Ba to Bd. Consequently, negative-pressure boosting is performed by the booster 101 to reach the full-load point (see input F4 in FIG. 8). The negative-pressure boosting provides a smooth brake pedal operation feeling. If either one of the fluid pressure systems of the first and second fluid pressure circuits 5A and 5B of the fluid pressure control unit 5 should fail, the other fluid pressure system can generate the required fluid pressure. Therefore, the braking function can be maintained.

In the foregoing description, the normal braking mode is performed at the input F3 or more in FIG. 8. It should be noted that the normal braking mode is not a mode of braking performed during normal running of the vehicle but is a braking mode in which braking by the fluid pressure control unit 5 or the regenerative brake device 8 is not performed, but the pressure in the master cylinder acts as the pressure of the wheel cylinders as in the conventional manual brakes (however, during the attitude stabilizing control, the fluid pressure control unit 5 operates even in the normal braking mode). For the brake operation during normal running of the vehicle, braking is performed at about the input F3 or less.

Further, in the foregoing description, the input at which the reaction force transmitting member 153 retracts to abut against the plunger 131 and a part of the reaction force from the fluid pressure in the master cylinder 110 acts on the plunger 131 and the input at which the regenerative brake device 8 terminates the regenerative braking are the same F3 by way of example. The present invention, however, is not limited thereto. The regenerative braking may be continued even after a part of the reaction force has acted on the plunger 131. In this case, however, it is necessary to devise a scheme to provide a smooth brake pedal operation feeling.

Next, a second embodiment of the booster according to the present invention will be explained with reference to FIG. 6. In the following description, members or portions similar to those shown in FIG. 2 are denoted by the same reference numerals as used in FIG. 2, and only the points in which the second embodiment differs from the first embodiment will be explained in detail.

Figure 6:
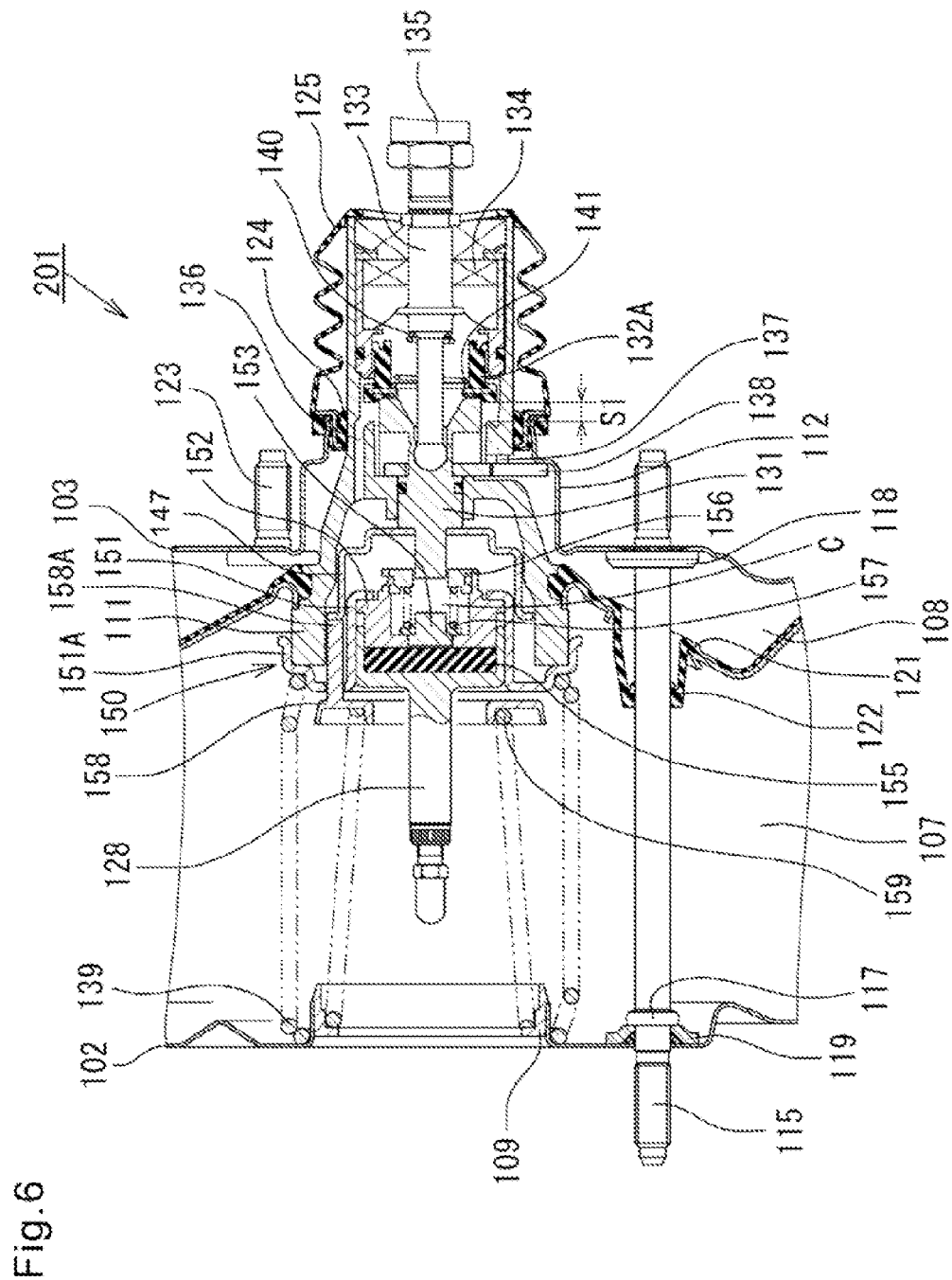
FIG. 6 is an enlarged vertical sectional view of a main part of a booster according to a second embodiment of the present invention.

FIG. 6 shows a main part pf a pneumatic booster 201 according to the second embodiment. In the booster 201, the master cylinder 110 (not shown in FIG. 6) is not provided with the idle stroke S (in this point, the second embodiment differs from the first embodiment). That is, the booster 201 uses a master cylinder with a small ineffective stroke (idle stroke S) of the type that has been conventionally mounted on a vehicle. An idle stroke S1 is provided in a control valve 132A of the booster 201 instead of being provided in the master cylinder 110. Accordingly, the constant-pressure passage 136 and the variable-pressure passage 137 are in communication with each other from when the booster 201 is in a non-braking position where the brake pedal 19 is not operated, as shown in FIG. 6. The constant-pressure passage 136 and the variable-pressure passage 137 are not cut off from each other until the input rod 133 advances relative to the valve body 111 by a distance corresponding to the idle stroke S1. In addition, a gap C1 is provided between the reaction force transmitting member 153 and the plunger 131. The gap C1 is larger than the gap C of the booster 101 shown in FIG. 2.

Accordingly, until the travel distance of the input rod 133 relative to the valve body 111 reaches the idle stroke S1 after the brake pedal 19 has been depressed, no differential pressure is produced between the constant-pressure chamber 107 and the variable-pressure chamber 108. Therefore, the valve body 111 does not advance. In addition, the plunger 131 does not abut against the reaction force transmitting member 153. Consequently, the output rod 128 does not press the primary piston 160 of the master cylinder 110.

When the brake pedal 19 is further depressed so that the stroke of the primary piston 160 reaches the idle stroke S1, the control valve 132A cuts the constant-pressure passage 136 and the variable-pressure passage 137 off from each other. When the plunger 131 further advances, the variable-pressure passage 137 is opened to the atmosphere through the dust seal 134. Consequently, a differential pressure is produced between the constant-pressure chamber 107 and the variable-pressure chamber 108. The differential pressure generates thrust in the power piston 106. The thrust causes the valve body 111 to advance, causing the output rod 128 to propel the primary piston 160, thereby generating a brake fluid pressure in the master cylinder 110. Thus, the booster 201 offers advantageous effects similar to those of the booster 101 shown in FIG. 2. In addition, the ineffective stroke of the master cylinder 110 need not be lengthened. Accordingly, the range for setting a master cylinder to be combined with the booster 201 widens, so that the matter of design can be simplified.

Next, a third embodiment of the booster according to the present invention will be explained with reference to FIG. 7. In the following description, members or portions similar to those shown in FIG. 2 are denoted by the same reference numerals as used in FIG. 2, and only the points in which the third embodiment differs from the first embodiment will be explained in detail.

Figure 7:
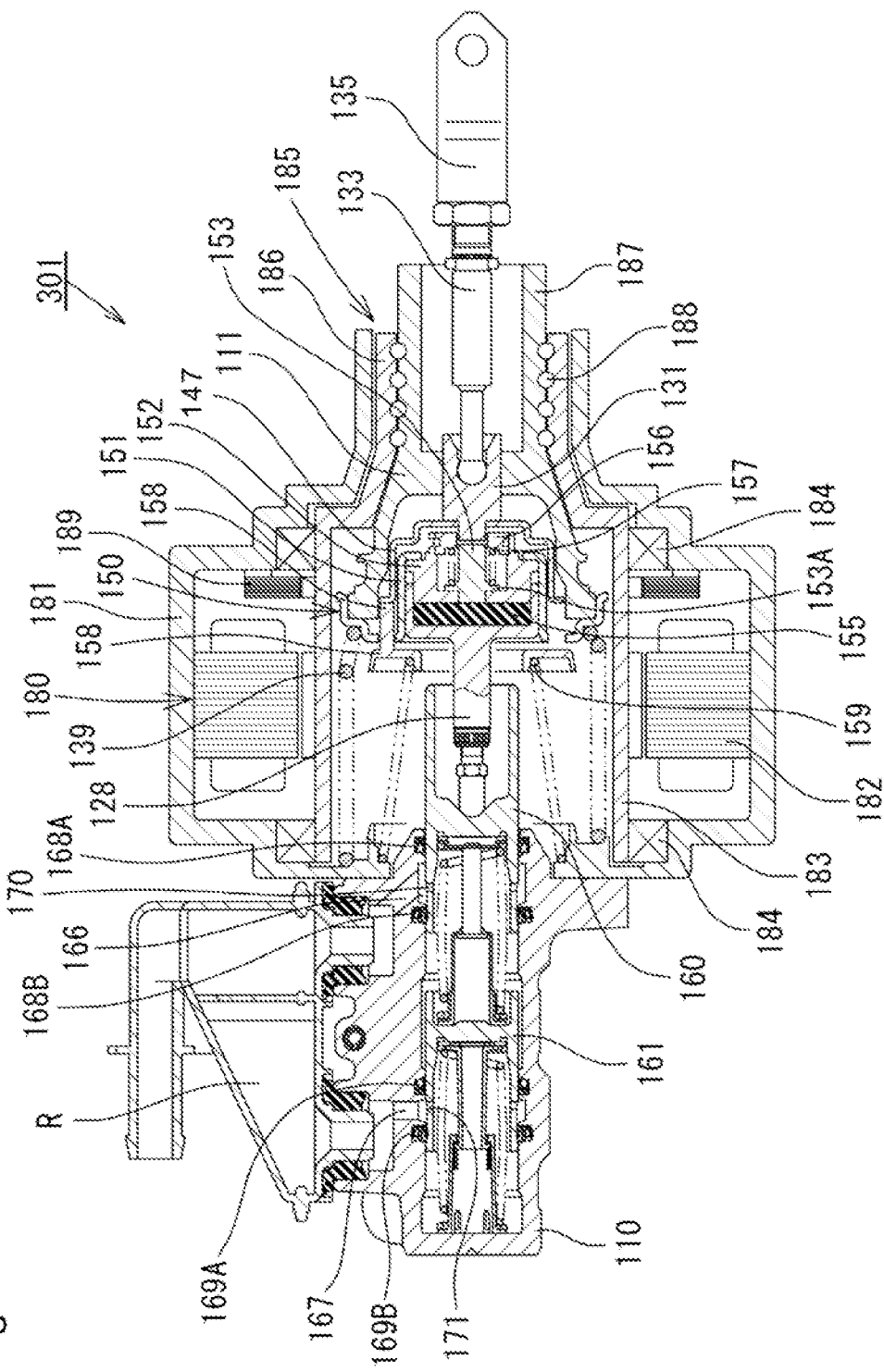
FIG. 7 is a vertical sectional view of a booster according to a third embodiment of the present invention.

A booster 301 according to the third embodiment shown in FIG. 7 is an electric motor-driven booster using an electric motor 180 as a boost source, which is an electric motor-driven actuator, in place of a pneumatic actuator. The valve body 111 has an annular stator 182 secured to the outer periphery thereof. The stator 182 constitutes the electric motor 180 at the inner periphery of a housing 181. The stator 182 has a circular cylindrical rotor 183 inserted therethrough. The rotor 183 is rotatably supported by the housing 181 through bearings 184. The rotor 183 and the valve body 111 are provided with a ball-screw mechanism 185 as a rotation-rectilinear motion conversion mechanism that converts the rotational motion of the rotor 183 into a rectilinear motion. The ball-screw mechanism 185 comprises a circular cylindrical rotating member 186 integrally formed at the rear end of the rotor 183, a rectilinearly moving member 187 integrally formed at the rear end of the valve body 111, and balls 188 (steel balls) loaded in spiral ball grooves formed on the mutually opposing inner and outer peripheral surfaces of the rotating member 186 and the rectilinearly moving member 187. As the rotating member 186 rotates, together with the rotor 183 as one unit, the balls 188 roll in the ball grooves, thereby causing the rectilinearly moving member 187 to move rectilinearly in the axial direction, together with the valve body 111 as one unit. The housing 181 is provided with a rotational position sensor 189, e.g. a resolver, for detecting the rotational position of the rotor 183.

The operation of the electric motor 180 is controlled based on the stroke of the input rod 133 detected by the stroke sensor 20 (see FIG. 1) provided on the brake pedal 19, thereby propelling the valve body 111 through the ball-screw mechanism 185 so as to follow the input rod 133. Consequently, the output rod 128 propels the primary piston 160 in the master cylinder 110 to generate a fluid pressure. Thus, the booster 301 can offer advantageous effects similar to those of the booster 101 shown in FIG. 2.

Although in the foregoing embodiments the vacuum source is an engine intake pipe, the present invention is not limited thereto. The vacuum source may be a vacuum pump or the like. Although in the foregoing embodiments the booster uses a pneumatic actuator or an electric motor-driven actuator as a boost source, the present invention is not limited thereto. It is also possible to use fluid pressure-driven or other types of actuators.

The boosters of the foregoing embodiments each include an input member movable in response to an operation of a brake pedal, an assisting member capable of advancing and retracting relative to the input member, an actuator propelling the assisting member in response to the movement of the input member so that the assisting member follows the input member, a reaction force distribution mechanism combining thrust of the input member and thrust of the assisting member into a combined thrust and transmitting the combined thrust to a piston of a master cylinder and further distributing a reaction force from the piston to the input member and to the assisting member, and a reaction force application member applying a reaction force to the propulsion of the input member. The input member does not receive the reaction force from the reaction force distribution mechanism until the input member has moved by a predetermined stroke from an initial position, but receives the reaction force from the reaction force distribution mechanism for a further stroke of the input member during the time from when a fluid pressure is generated in the master cylinder in response to the operation of the brake pedal until the thrust of the actuator reaches a full-load state.

With the above-described structure, it is possible to reduce the variation of reaction force to the brake pedal during regenerative cooperative control and hence possible to improve the brake pedal operation feeling.

In the boosters of the first and second embodiments, the actuator is a pneumatic actuator.

In the booster of the third embodiment, the actuator is an electric motor-driven actuator.

In the boosters of the foregoing embodiments, the master cylinder is connected with a wheel cylinder through a fluid pressure control unit. The wheel cylinder generates braking force upon being supplied with a fluid pressure. The fluid pressure control unit controls the fluid pressure to be supplied to the wheel cylinder. The booster of each embodiment is used in combination with a regenerative brake device. The booster can execute regenerative cooperative control by controlling through the fluid pressure control unit the fluid pressure to be supplied to the wheel cylinder in accordance with regenerative braking force generated by the regenerative brake device. It is set that the reaction force from the fluid pressure is transmitted to the input member after the regenerative braking force generated by the regenerative brake device has reached a predetermined maximum regenerative state.

It should be noted that the term "after the maximum regenerative state has been reached" as used herein does not mean that the reaction force is transmitted to the input member after the maximum regenerative state has been reached under any vehicle running conditions. It means that a maximum braking force (e.g. 0.1 G) of the regenerative brake device and a pedal pressure (input to the input rod) for generating the maximum braking force are set in the stage of designing the vehicle, and the reaction force distribution mechanism and the reaction force application member are set so that the reaction force from the fluid pressure in the master cylinder is transmitted to the input member at a pedal pressure (F3) higher than the set pedal pressure.

With the above-described structure, it is possible to reduce the variation of reaction force to the brake pedal during regenerative cooperative control to improve the brake pedal operation feeling.

In the boosters of the foregoing embodiments, the predetermined stroke of the input member is equal to a length between an initial position and a position reached by the input member when regenerative cooperative control by the fluid pressure control unit terminates. It should be noted that the predetermined stroke can be set appropriately.

The boosters of the first and second embodiments have a housing divided into a constant-pressure chamber and a variable-pressure chamber by a power piston, a valve body provided in the housing so as to be capable of advancing and retracting and connected to the power piston, an input rod inserted in the valve body so as to be capable of advancing and retracting and connected to a brake pedal, a plunger disposed in the valve body and connected to the input rod, a valve device selectively opened and closed by movement of the plunger to introduce and discharge a working fluid into and from the variable-pressure chamber, an output rod to which thrust of the power piston is transmitted through a reaction member, a reaction force application member applying a reaction force to the propulsion of the input rod, and a reaction force adjusting member disposed between the reaction member and the plunger to adjust the reaction force transmitted from the reaction member to the plunger. The plunger has a gap provided between itself and the reaction force adjusting member, so that the plunger does not abut against the reaction force adjusting member until the input rod has moved by a predetermined stroke from an initial position. The reaction force adjusting member abuts against the plunger when the reaction force from the output rod has increased by a predetermined amount, to transmit the reaction force from the reaction member to the plunger.

With the above-described structure, it is possible to reduce the variation of reaction force to the brake pedal during regenerative cooperative control to improve the brake pedal operation feeling.

In the boosters of the first and second embodiments, the output rod propels a piston in the master cylinder. The master cylinder generates a fluid pressure after the piston has reached a predetermined idle stroke position from an initial position. The plunger abuts against the reaction force adjusting member after the piston has reached the idle stroke position.

In the boosters of the first and second embodiments, the master cylinder is connected with a wheel cylinder through a fluid pressure control unit. The wheel cylinder generates braking force upon being supplied with a fluid pressure. The fluid pressure control unit controls the fluid pressure to be supplied to the wheel cylinder. The booster of each embodiment is used in combination with a regenerative brake device. The booster can execute regenerative cooperative control by controlling through the fluid pressure control unit the fluid pressure to be supplied to the wheel cylinder in accordance with regenerative braking force generated by the regenerative brake device. The plunger abuts against the reaction force adjusting member after the regenerative braking force generated by the regenerative brake device has reached a predetermined maximum regenerative state.

In the boosters of the first and second embodiments, the plunger abuts against the reaction force adjusting member when the stroke of the input rod has reached a position at which the regenerative cooperative control by the fluid pressure control unit terminates.

In the booster of the second embodiment, the valve device does not introduce the working fluid into the variable-pressure chamber until the stroke of the input rod reaches a predetermined stroke position.

With the above-described structure, the ineffective stroke of the master cylinder need not be lengthened. Accordingly, the range for setting a master cylinder to be combined with the booster widens, so that the matter of design can be simplified.

The brake apparatus of each of the foregoing embodiments is a brake apparatus for use in a vehicle having a regenerative brake device provided for at least one wheel to generate a regenerative braking force. The brake apparatus includes a master cylinder generating a fluid pressure by propulsion of a piston and a booster that inputs an operation force of a brake pedal to an input member to boost the operation force and to propel the piston of the master cylinder with the boosted operation force. The booster has a reaction force application member that applies a reaction force to the propulsion of the input member. The brake apparatus further includes a stroke sensor detecting a stroke of the brake pedal, and a fluid pressure control unit interposed between the master cylinder and a wheel cylinder that brakes the wheel with a fluid pressure supplied thereto. The fluid pressure control unit controls the fluid pressure to be supplied to the wheel cylinder. Further, the brake apparatus includes a regenerative cooperative device producing a braking force corresponding to the stroke of the brake pedal by distribution between a braking force generated by the regenerative brake device and a braking force generated by the supply of fluid pressure from the fluid pressure control unit to the wheel cylinder. At least either one of the master cylinder and the booster keeps the master cylinder from generating a fluid pressure until the brake pedal moves from an initial position to a stroke position beyond a predetermined maximum regenerative position at which the braking force of the regenerative brake device reaches a predetermined maximum regenerative state. The booster does not receive a reaction force from the fluid pressure in the master cylinder until the fluid pressure in the master cylinder reaches a predetermined fluid pressure, or until the stroke of the brake pedal reaches the maximum regenerative position. The booster receives a reaction force from the fluid pressure in the master cylinder after the fluid pressure in the master cylinder has reached a predetermined fluid pressure, or after the stroke of the brake pedal has reached the maximum regenerative position.

Although in the foregoing embodiments the fluid pressure control unit 5 is provided, the fluid pressure control unit 5 can be eliminated by providing the function of cooperating with the regenerative brake device on the master cylinder side.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2011-23869 filed on Feb. 7, 2011.

The entire disclosure of Japanese Patent Application No. 2011-23869 filed on Feb. 7, 2011 including specification, claims, drawings and summary is incorporated herein by reference in its entirety.

What is claimed is:

1. A booster comprising:
   an input member movable in response to an operation of a brake pedal, a distal end side of the input member being disposed in a housing;
   an assisting member capable of advancing and retracting relative to the input member;
   an actuator arranged to propel the assisting member in response to movement of the input member so that the assisting member follows the input member;
   a reaction force distribution mechanism arranged to combine thrust of the input member and thrust of the assisting member into a combined thrust and transmit the combined thrust to a piston in a master cylinder and further distribute a reaction force from the piston to the input member and to the assisting member;
   a reaction force transmitting member arranged to receive at least part of the reaction force from the reaction force distribution mechanism;
   a plunger disposed between the input member and the reaction force transmitting member;
   a reaction force adjusting spring interposed between an enlarged-diameter spring retainer of the reaction force transmitting member and a guide portion that guides the reaction force transmitting member; and
   a reaction force application member including an end supported by the housing and an opposite end urging the input member so as to apply a reaction force to propulsion of the input member;
   wherein the input member does not receive the reaction force from the reaction force distribution mechanism, and receives the reaction force from the reaction force application member due to presence of a gap between the plunger and the reaction force transmitting member until the input member has moved from an initial position to a predetermined stroke position after a fluid pressure has been generated in the master cylinder in response to the operation of the brake pedal and until the reaction force from a fluid pressure acting on the reaction force transmitting member through the reaction force distribution mechanism reaches the spring force of the reaction force adjusting spring, but receives the reaction force from the reaction force distribution mechanism and the reaction force from the reaction force application member after the plunger abuts against the reaction force transmitting member when the input member has exceeded the predetermined stroke, and the reaction force applied from the fluid pressure through the reaction force distribution mechanism to the reaction force transmitting member has exceeded the spring force of the reaction force adjusting spring.

2. The booster of claim 1, wherein the actuator is a pneumatic actuator.

3. The booster of claim 1, wherein the actuator is an electric motor-driven actuator.

4. The booster of claim 1, which is used in combination with a regenerative brake device;
   wherein the predetermined stroke position of the input member is set at a position reached by the input member after a regenerative braking force generated by the regenerative brake device has reached a maximum regenerative state.

5. The booster of claim 4, wherein the predetermined stroke position of the input member is a position reached by the input member when regenerative braking terminates.

6. A pneumatic booster comprising:
a housing divided into a constant-pressure chamber and a variable-pressure chamber by a power piston;
a valve body provided in the housing so as to be capable of advancing and retracting, the valve body being connected to the power piston;
an input rod disposed in the valve body so as to be capable of advancing and retracting, the input rod being connected to a brake pedal;
a plunger disposed in the valve body and connected to the input rod;
a valve device selectively opened and closed by movement of the plunger to introduce and discharge a working fluid into and from the variable-pressure chamber;
an output rod to which thrust of the power piston is transmitted through a reaction member;
a reaction force application member including an end supported by the housing and an opposite end urging the input rod, the reaction force application member being arranged to apply a reaction force to propulsion of the input rod; and
a reaction force transmitting member disposed between the reaction member and the plunger to adjust the reaction force transmitted from the reaction member to the plunger;
wherein a gap is provided between the plunger and the reaction force adjusting member, so that the plunger does not abut against the reaction force adjusting member until the input rod moves from an initial position to a predetermined stroke position, and the reaction force adjusting member abuts against the plunger when the reaction force from the output rod has increased by a predetermined amount, to transmit the reaction force from the reaction member to the plunger,
wherein the output rod propels a piston in a master cylinder,
the master cylinder generates a fluid pressure after the piston in the master cylinder has reached a predetermined idle stroke position from an initial position, and
the plunger abuts against the reaction force adjusting member after the piston in the master cylinder has reached the idle stroke position,
wherein the pneumatic booster is used in combination with a regenerative brake device, and the plunger abuts against the reaction force adjusting member after a regenerative braking force generated by the regenerative brake device has reached a maximum regenerative state.

7. The booster of claim 6, wherein the predetermined stroke position of the input rod is a position in which the plunger abuts against the reaction force adjusting member when regenerative braking terminates.

8. The booster of claim 6, wherein the valve device does not introduce the working fluid into the variable-pressure chamber until the input rod reaches the predetermined stroke position.

9. A booster comprising:
an input member movable in response to an operation of a brake pedal;
an assisting member capable of advancing and retracting relative to the input member;
an actuator arranged to propel the assisting member in response to movement of the input member so that the assisting member follows the input member;
a reaction force distribution mechanism arranged to combine thrust of the input member and thrust of the assisting member into a combined thrust and transmit the combined thrust to a piston in a master cylinder and further distribute a reaction force from the piston to the input member and to the assisting member;
a reaction force transmitting member arranged to receive at least part of the reaction force from the reaction force distribution mechanism;
a plunger disposed between the input member and the reaction force transmitting member;
a reaction force adjusting spring interposed between an enlarged-diameter spring retainer of the reaction force transmitting member and a guide portion that guides the reaction force transmitting member; and
a biasing force application member arranged to apply a biasing force to propulsion of the input member,
wherein the input member includes:
a first stroke position (F2) at which generation of a fluid pressure in the master cylinder is started in response to the operation of the brake pedal from an initial position; and
a second stroke position (F3) after a fluid pressure is generated in the master cylinder in response to the operation of the brake pedal,
wherein the input member does not receive the reaction force from the reaction force distribution mechanism due to presence of a gap between the plunger and the reaction force transmitting member until the input member is moved to the second stroke position and until the reaction force from a fluid pressure acting on the reaction force transmitting member through the reaction force distribution mechanism reaches the spring force of the reaction force adjusting spring,
but the input member receives the reaction force from the reaction force distribution mechanism and the biasing force from the biasing force application member after the plunger abuts against the reaction force transmitting member when the input member has exceeded the second stroke position (F3), and the reaction force applied from the fluid pressure through the reaction force distribution mechanism to the reaction force transmitting member has exceeded the spring force of the reaction force adjusting spring, and
wherein the booster is capable of being used in combination with a regenerative brake device,
the first stroke position (F2) of the input member is set at a position reached by the input member before a regenerative braking force generated by the regenerative brake device reaches a maximum regenerative state,
the second stroke position (F3) of the input member is set at a position reached by the input member after a regenerative braking force generated by the regenerative brake device reaches the maximum regenerative state.

10. The booster of claim 9, wherein the actuator is a pneumatic actuator.

11. The booster of claim 9, wherein the second stroke position (F3) of the input member is a position reached by the input member when regenerative braking terminates.

12. A pneumatic booster comprising:
a housing divided into a constant-pressure chamber and a variable-pressure chamber by a power piston;
a valve body provided in the housing so as to be capable of advancing and retracting, the valve body being connected to the power piston;
an input rod disposed in the valve body so as to be capable of advancing and retracting, the input rod being connected to a brake pedal;
a plunger disposed in the valve body and connected to the input rod;
a valve device selectively opened and closed by movement of the plunger to introduce and discharge a working fluid into and from the variable-pressure chamber;
an output rod to which thrust of the power piston is transmitted through a reaction member;
a reaction force application member arranged to apply a reaction force to propulsion of the input rod; and
a reaction force adjusting member disposed between the reaction member and the plunger to adjust the reaction force transmitted from the reaction member to the plunger,
wherein the input rod includes:
a first stroke position (F2) at which generation of a fluid pressure in a master cylinder is started in response to the operation of the brake pedal from an initial position, and
a second stroke position (F3) after a fluid pressure is generated in the master cylinder in response to the operation of the brake pedal,
wherein a gap is provided between the plunger and the reaction force adjusting member, so that the plunger does not abut against the reaction force adjusting member until the input rod moves from an initial position to the second stroke position (F3), and the reaction force adjusting member abuts against the plunger when the reaction force from the output rod has increased by a predetermined amount, to transmit the reaction force from the reaction member to the plunger,
wherein the output rod propels a piston in the master cylinder,
wherein the master cylinder starts to generate a fluid pressure in the first stroke position (F2) when the piston of the master cylinder reaches a predetermined idle stroke position from an initial position,
wherein the plunger abuts against the reaction force adjusting member in the second stroke position (F3) after the piston of the master cylinder reaches the predetermined idle stroke position,
wherein the booster is capable being used in combination with a regenerative brake device,
wherein the first stroke position (F2) is set at a position reached by the input rod before a regenerative braking force generated by the regenerative brake device reaches a maximum regenerative state,
wherein the second stroke position (F3) is set at a position reached by the input rod after a regenerative braking force generated by the regenerative brake device reaches a maximum regenerative state, and
wherein the plunger abuts against the reaction force adjusting member at the second stroke position (F3).

13. The booster of claim 12, wherein the predetermined stroke position of the input rod is a position in which the plunger abuts against the reaction force adjusting member when regenerative braking terminates.

* * * * *